United States Patent Office 3,657,233

Patented Apr. 18, 1972

1

3,657,233

10-MORPHOLINO-1,2,3,4-TETRAHYDROBENZO-[b][1,6]NAPHTHYRIDINE DERIVATIVES

Milton Wolf, West Chester, and James L. Diebold, Havertown, Pa., assignors to American Home Products Corporation, New York, N.Y.

No Drawing. Application Sept. 16, 1968, Ser. No. 760,063, now Patent No. 3,580,915, which is a continuation-in-part of applications Ser. No. 533,802 and Ser. No. 533,793, both Mar. 14, 1966, and Ser. No. 581,756, Sept. 22, 1966. Divided and this application Apr. 30, 1970, Ser. No. 33,510

Int. Cl. C07d *87/40*

U.S. Cl. 260—247.5 1 Claim

ABSTRACT OF THE DISCLOSURE

This invention concerns 1,2,3,4-tetrahydro-2-methyl-10-morpholino-8-nitro[b][1,6] naphthyridine which is pharmacologically active as a central nervous system depressant.

This application is a division of U.S. application Ser. No. 760,063, Pat. No. 3,580,915 entitled "1,2,3,4-tetrahydrobenzo[b][1,6] Naphthyridine Derivatives," filed on Sept. 16, 1968 by Milton Wolf and James L. Diebold, which in turn is a continuation-in-part of now abandoned United States Patent Applications, Serial No. 533,802, entitled "10-Aminobenzo[b][1,6]Naphthyridines," filed on Mar. 14, 1966 by Milton Wolf; Ser. No. 533,793, entitled "1,2,3,4 - Tetrahydrobenzo[b][1,6]Naphthyridine Derivatives," filed Mar. 14, 1966 by Milton Wolf and James L. Diebold; and Ser. No. 581,756, entitled "1,2,3,4-Tetrahydrobenzo[b][1,6]Naphthyridine Derivatives," filed Sept. 22, 1966 by Milton Wolf and James L. Diebold.

SUMMARY OF THE INVENTION

This invention is directed to the compound, 1,2,3,4-tetrahydro-2-methyl-10 - morpholino - 8 - nitro[b][1,6]-naphthyridine. In standard and accepted pharmacological tests said compound has demonstrated central nervous system depressant activity which is useful in producing

2 a claiming effect in warm-blooded animals. A description of the manner and process of making and using the invention is disclosed and taught in the aforesaid U.S. Pat. No. 3,580,915, the complete specification of which is incorporated herein by reference.

DESCRIPTION OF THE PREFERRED EMBODIMENT 10-chloro-1,2,3,4-tetrahydro-2-methyl - 8 - nitro-benzo-[b][1,6]naphthyridine (5.0 g., 0.018 m.) and phenol (3.38 g., 0.036 m.) is heated under nitrogen at 100° C. for fifteen minutes until a clear melt is obtained. Morpholine (3.50 ml., 0.040 m.) is then added dropwise with stirring and the mixture is heated at 135–140° C. for five hours. The reaction product is dissolved in methylene chloride and extracted with a 20% potassium hydroxide solution. After being dried over anhydrous sodium sulfate, the methylene chloride solution is evaporated giving the free base. This product is triturated with ethyl acetate and recrystallized from benzene giving 1,2,3,4-tetrahydro-2-methyl-10 - morpholino - 8 - nitrobenzo[b]-[1,6]naphthyridine as a crystalline solid, M.P. 216–217° C. (uncorr.).

*Analysis.*—Calculated for $C_{17}H_{20}N_4O_3$ (percent): C, 62.17; H, 6.14; N, 17.06. Found (percent): C, 61.99; H, 5.92; N, 16.98.

What is claimed is:

1. The compound which is: 1,2,3,4-tetrahydro-2-methyl-10-morpholino-8-nitrobenzo[b][1,6]naphthyridine.

References Cited

Kempter et al.: Chemical Abstracts vol. 60, page 8005 (1964).

Buu-Hoi et al.: Chemical Abstracts vol. 60, page 8006 (1964).

ALEX MAZEL, Primary Examiner

J. TOVAR, Assistant Examiner

U.S. Cl. X.R.

424—248